United States Patent
Chang et al.

(10) Patent No.: US 7,689,847 B2
(45) Date of Patent: Mar. 30, 2010

(54) METHOD FOR INCREASING THE DATA PROCESSING CAPABILITY OF A COMPUTER SYSTEM

(75) Inventors: Nai-Shung Chang, Taipei (TW); Chia-Hsing Yu, Taipei (TW)

(73) Assignee: Via Technologies, Inc., Taipei (TW)

( * ) Notice: Subject to any disclaimer, the term of this patent is extended or adjusted under 35 U.S.C. 154(b) by 700 days.

(21) Appl. No.: 11/423,718

(22) Filed: Jun. 13, 2006

(65) Prior Publication Data

US 2007/0288769 A1 Dec. 13, 2007

(51) Int. Cl.
*G06F 1/00* (2006.01)

(52) U.S. Cl. ................. 713/322; 713/300; 713/340

(58) Field of Classification Search .......... 713/300, 713/322, 340
See application file for complete search history.

(56) References Cited

U.S. PATENT DOCUMENTS

| | | | | |
|---|---|---|---|---|
| 6,175,929 | B1 * | 1/2001 | Hsu et al. ................. | 713/500 |
| 6,457,135 | B1 * | 9/2002 | Cooper ..................... | 713/323 |
| 6,496,888 | B1 * | 12/2002 | Pole, II .................... | 710/110 |
| 6,763,478 | B1 * | 7/2004 | Bui .......................... | 713/600 |
| 6,845,456 | B1 * | 1/2005 | Menezes et al. ........... | 713/320 |
| 6,865,653 | B2 * | 3/2005 | Zaccarin et al. ........... | 711/154 |
| 7,085,944 | B1 * | 8/2006 | Hamilton .................. | 713/320 |
| 7,100,061 | B2 * | 8/2006 | Halepete et al. ........... | 713/322 |
| 7,149,911 | B2 * | 12/2006 | Yeh .......................... | 713/322 |
| 7,203,856 | B2 * | 4/2007 | Yeh .......................... | 713/322 |
| 7,206,960 | B2 * | 4/2007 | Barr et al. .................. | 713/600 |
| 7,237,131 | B2 * | 6/2007 | Kwa et al. ................. | 713/323 |
| 7,295,949 | B2 * | 11/2007 | Vorenkamp et al. ........ | 702/182 |
| 7,343,433 | B2 * | 3/2008 | Yoon et al. ................. | 710/52 |
| 7,398,414 | B2 * | 7/2008 | Sherburne, Jr. ........... | 713/600 |
| 7,454,651 | B2 * | 11/2008 | Chen ........................ | 713/600 |
| 2003/0051174 | A1 * | 3/2003 | Toll et al. ................... | 713/300 |
| 2004/0168095 | A1 * | 8/2004 | Yeh .......................... | 713/300 |
| 2004/0168096 | A1 * | 8/2004 | Yeh .......................... | 713/300 |
| 2004/0243868 | A1 * | 12/2004 | Toll et al. ................... | 713/323 |
| 2005/0102539 | A1 * | 5/2005 | Hepner et al. .............. | 713/300 |
| 2005/0138459 | A1 * | 6/2005 | Yoon et al. ................. | 713/600 |
| 2005/0149768 | A1 * | 7/2005 | Kwa et al. .................. | 713/300 |
| 2006/0026447 | A1 * | 2/2006 | Naveh et al. ............... | 713/322 |
| 2006/0080566 | A1 * | 4/2006 | Sherburne, Jr. ............ | 713/500 |
| 2006/0156045 | A1 * | 7/2006 | Galles ....................... | 713/300 |
| 2006/0168461 | A1 * | 7/2006 | Allen ........................ | 713/300 |
| 2006/0174142 | A1 * | 8/2006 | Lin et al. ................... | 713/300 |
| 2007/0067657 | A1 * | 3/2007 | Ranganathan et al. ...... | 713/320 |
| 2007/0300088 | A1 * | 12/2007 | Lippojoki .................. | 713/320 |

* cited by examiner

*Primary Examiner*—Thomas Lee
*Assistant Examiner*—Jaweed A Abbaszadeh
(74) *Attorney, Agent, or Firm*—Thomas, Kayden, Horstemeyer & Risley (57) ABSTRACT

A method for dynamically increasing the data processing capability of a computer system is provided. The computer system comprises a processor, a memory and a chipset. The data processing capability of the computer system is classified into a predetermined number of performance enhancing modes. At least one performance enhancing mode transition condition is checked to determine whether to automatically raise the performance enhancing mode of the computer system. The processor is suspended from using the processor bus during the transition of the performance enhancing mode of the computer system. The performance enhancing mode of the computer system is raised by increasing a first working frequency of the processor, a second working frequency of the processor bus and a third working frequency of the memory. The data processing rate of the computer system is further increased when the performance enhancing mode of the computer system is further raised.

25 Claims, 10 Drawing Sheets

FIG. 1

| Performance Enhancing Mode | PEM 0 | PEM 1 | PEM 2 | PEM 3 |
|---|---|---|---|---|
| Processor bus frequency | 200MHz | 200MHz | 233MHz | 233MHz |
| Memory frequency | 200MHz | 233MHz | 266MHz | 333MHz |
| Chipset core voltage ($V_{DD}$) | 1.5V | 1.55V | 1.6V | 1.7V |
| Memory voltage ($V_{DDQ}$ / $V_{TT}$) | 1.8V/0.9V | 1.9V/0.95V | 1.9V/0.95V | 2.0V/1.0V |
| PEMPWR[1:0]# | 11 | 10 | 01 | 00 |
| PEMPWR[3:2]# | 11 | 10 | 01 | 00 |
| PEMFREQ[1:0]# | 11 | 10 | 01 | 00 |
| Note | Normal data processing rate | Higher data processing rate | Higher data processing rate | Higher data processing rate |

METHOD FOR INCREASING THE DATA PROCESSING CAPABILITY OF A COMPUTER SYSTEM

BACKGROUND OF THE INVENTION

1. Field of the Invention

The invention relates to a computer system, and more particularly to increasing the data processing capability of a computer system.

2. Description of the Related Art

Over-clocking is a popular technique for raising the performance of a computer system. The data processed amount of a computer system during a predetermined period is limited, because the largest number of operations executed by a processor of the computer system during the period is also fixed. The data processing rate of the computer system, however, can be economically raised without requiring much additional hardware. Because the execution speed of a processor is determined by the clock frequency of the processor, the processor runs faster when the clock frequency is increased. Thus, the data processing rate of the processor, or the performance of the computer system, can be raised by over-clocking.

Before the clock frequency of the computer system is increased with over-clocking, a jumper on the motherboard of the computer system often has to be changed to indicate the selected clock frequency. After the motherboard and processor is reset, the computer system runs at the increased speed. This means that an ordinary computer system cannot dynamically adjust the data processing capability according to the processor and the application, because the data processing capability can only be manually adjusted through the jumper selection. Additionally, the computer system must be reset before the clock frequency is increased, causing great inconvenience to users. Thus, the invention provides a method for dynamically increasing the data processing capability of a computer system to improve the performance of the computer system.

BRIEF SUMMARY OF THE INVENTION

A method for dynamically increasing the data processing capability of a computer system is provided. The computer system comprises a processor, a memory and a chipset, and the processor is connected with the chipset through a processor bus. The data processing capability of the computer system is classified into a predetermined number of performance enhancing modes. At least one performance enhancing mode transition condition is checked to determine whether to automatically raise the performance enhancing mode of the computer system. The processor is suspended from using the processor bus during the transition of the performance enhancing mode of the computer system. The performance enhancing mode of the computer system is raised by raising a first working frequency of the processor, a second working frequency of the processor bus and a third working frequency of the memory. The data processing rate of the computer system is further increased when the performance enhancing mode of the computer system is further raised.

A method for dynamically increasing the data processing capability of a computer system is provided. The computer system comprises a processor, a memory and a chipset, the processor is connected to the chipset via a processor bus. The data processing capability of the computer system is classified into a predetermined number of performance enhancing modes. A performance enhancing mode controller included in the chipset is first enabled to control the performance enhancing modes of the computer system. At least one performance enhancing mode transition condition is then checked to determine whether to raise the performance enhancing mode of the computer system. A BPRI# or a BNR# pin of the chipset is then asserted to suspend the processor from using the processor bus during the transition of the performance enhancing mode of the computer system. A first working frequency of the processor, a second working frequency of the processor bus and a third working frequency of the memory are then increased if the performance enhancing mode is raised. The BPRI# or the BNR# pin of the chipset is de-asserted after the transition of the performance enhancing mode of the computer system. The data processing rate of the computer system is further increased when the performance enhancing mode of the computer system is further raised.

A chipset capable of dynamically increasing the data processing capability of a computer system is provided. The computer system comprises a processor, a memory and a chipset, the processor is connected to the chipset through a processor bus. The data processing capability of the computer system is classified into a predetermined number of performance enhancing modes. The chipset comprises at least one frequency control pin, coupled between the chipset and a system clock synthesizer which controls a first working frequency of the processor, a second working frequency of the processor bus and a third working frequency of the memory. The chipset also comprises a performance enhancing mode controller, coupled to the frequency control pin, for checking at least one performance enhancing mode transition condition to determine whether to raise the performance enhancing mode of the computer system, suspending the processor from using the processor bus during the transition of the performance enhancing mode of the computer system, and signaling the system clock synthesizer to increase the first, second and third working frequency through the at least one frequency control pin if the performance enhancing mode is raised. The data processing rate of the computer system is further increased when the performance enhancing mode of the computer system is further raised.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
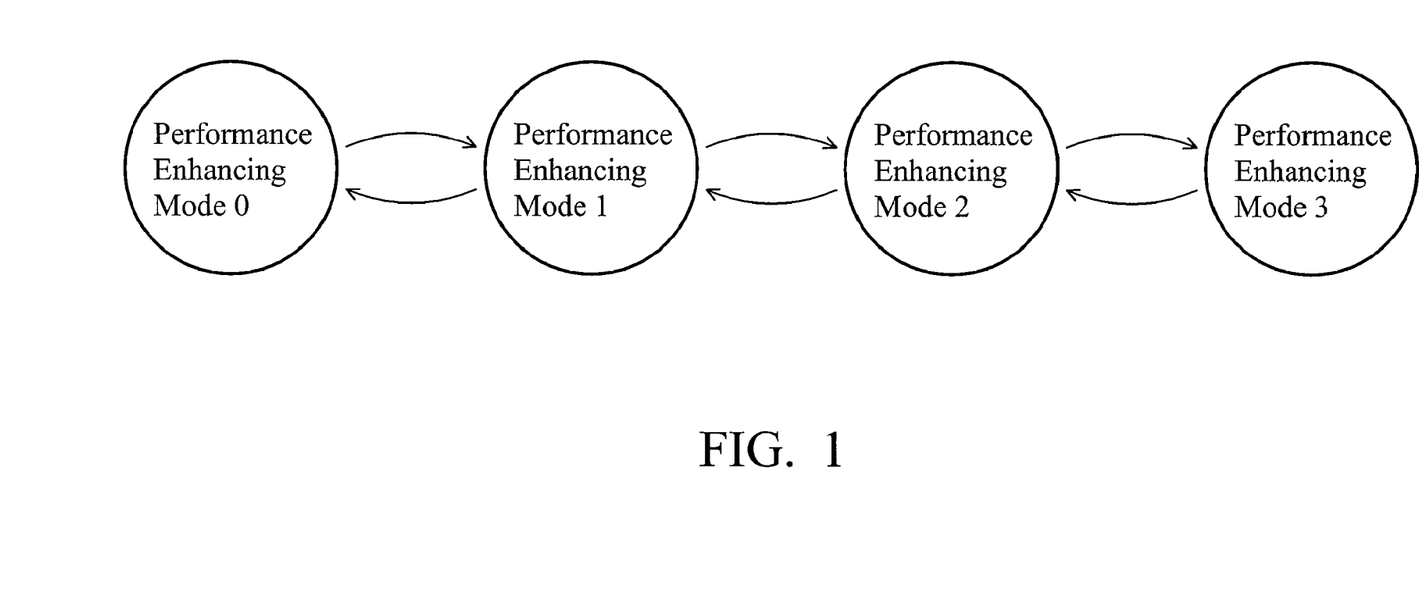
FIG. 1 shows the state transition of four performance enhancing modes with different data processing capabilities according to the invention.

FIG. 1 shows the state transition of four performance enhancing modes (PEM) with different data processing capabilities according to the invention. The data processing capability of a computer system can be raised into different levels from a normal state, and each data processing capability level represents one of multiple performance enhancing modes. There are four performance enhancing modes in FIG. 2, but the number of performance enhancing modes can vary according to the requirements. When a computer is operating in a normal work state, it enters the performance enhancing mode 0. The data processing capability of the computer system is not increased under the performance enhancing mode 0. When the performance enhancing mode of the computer system is raised from 0 to 1, the data processing rate of the computer system is increased. Similarly, the data processing capability of performance enhancing mode N+1 is further increased in comparison with that of performance enhancing mode N. In FIG. 1, if the performance enhancing mode of the computer is changed from PEM 0 to PEM 2, the computer must sequentially enter PEM 1 and then enter PEM 2. In other embodiments, however, the performance enhancing mode can be directly changed from the current performance enhancing mode to the desired performance enhancing mode. All transitions between different performance enhancing modes proceed while the computer is operating.

Each of the performance enhancing modes of the computer system has a different voltage supply level and working frequency setting. The performance enhancing mode of the computer system can be set manually through a software application. In other embodiments, the computer checks a few performance enhancing mode transition conditions to determine whether to automatically change the performance enhancing mode of the computer system. If the performance enhancing mode of the computer system is raised, the working frequency of the computer system is increased to increase data processing rate of the computer system, and the voltage supply level of the computer system is also raised to provide the additional power required due to the enhanced data processing capability. If the performance enhancing mode of the computer system is lowered, the working frequency of the computer system is decreased, and the voltage supply level of the computer system is reduced to return to a previous data processing capability level.

Figure 2:
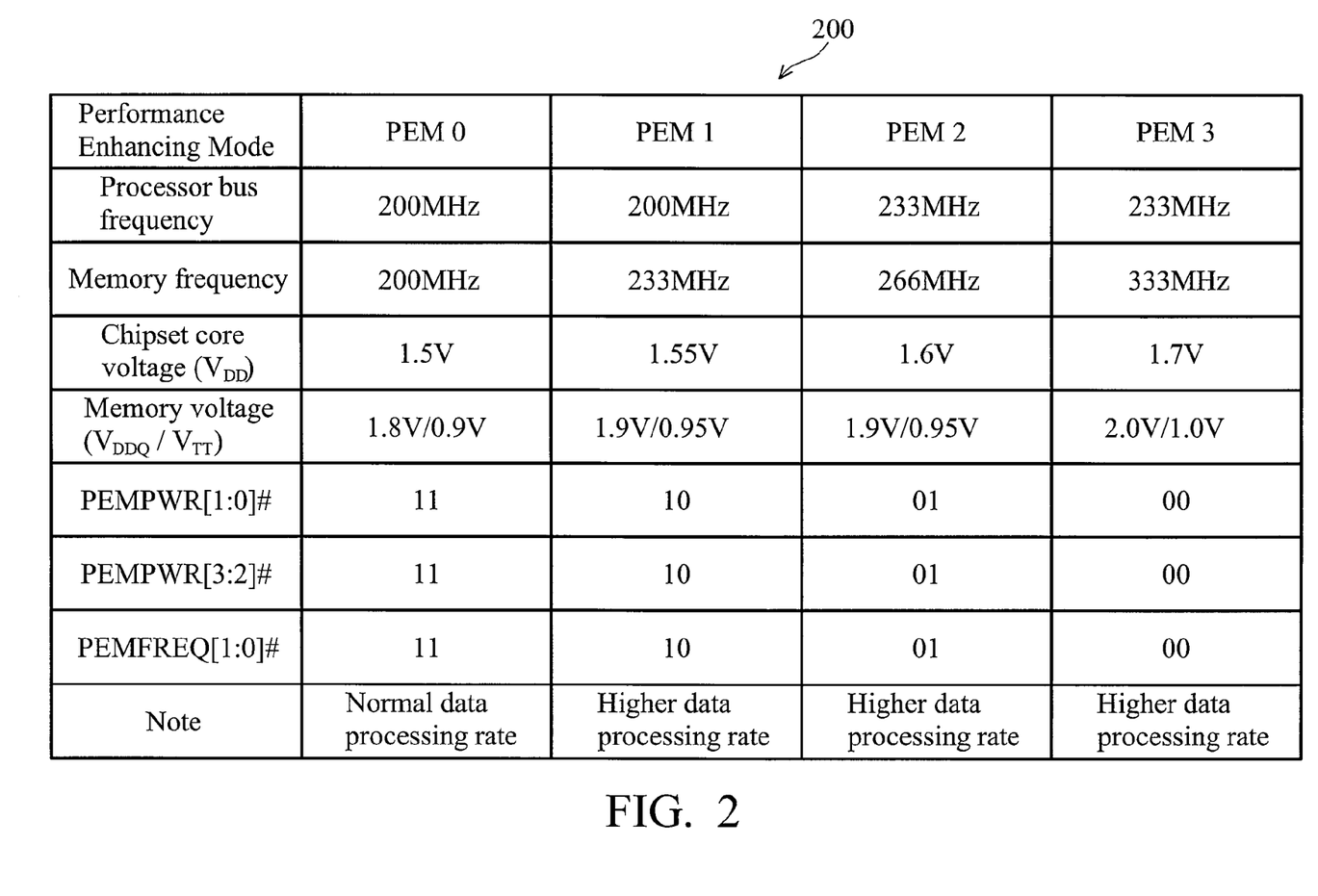
FIG. 2 shows a table listing the voltage supply level and the working frequency of different performance enhancing modes.

FIG. 2 shows a table 200 listing the working frequency and voltage supply level for different performance enhancing modes. Each column of table 200 corresponds to one of the four performance enhancing modes of FIG. 1. The computer system comprises a processor, a memory and a chipset. The processor is connected with the chipset through a processor bus. The first row of table 200 shows the working frequency of the processor bus. The working frequency of the processor bus is 200 MHz in PEM 0, and is increased to 233 MHz in PEM 2 and 3. The second row of table 200 shows the working frequency of the memory. The working frequency of the memory is 200 MHz in PEM 0, and it is respectively increased to 233, 266 and 333 MHz in PEM 1, 2, and 3. The third row of table 200 shows the voltage supply level ($V_{DD}$) of the chipset. The voltage supply level of the chipset is 1.5 V in PEM 0, and it is respectively raised to 1.55, 1.6 and 1.7 V in PEM 1, 2 and 3 to provide the additional power required due to the enhanced data processing capability. The fourth row of table 200 shows the voltage supply level of the memory, including an input-output voltage ($V_{DDQ}$) and a termination voltage ($V_{TT}$). The input-output voltage level of the memory is 1.8 V in PEM 0, and it is raised to 1.90 V in PEM 1 and 3. The termination voltage level of the memory is 0.9 V in PEM 0, and it is raised to 0.95 V in PEM 1 and 2, and it is raised to 1.0V in PEM3.

Figure 3:
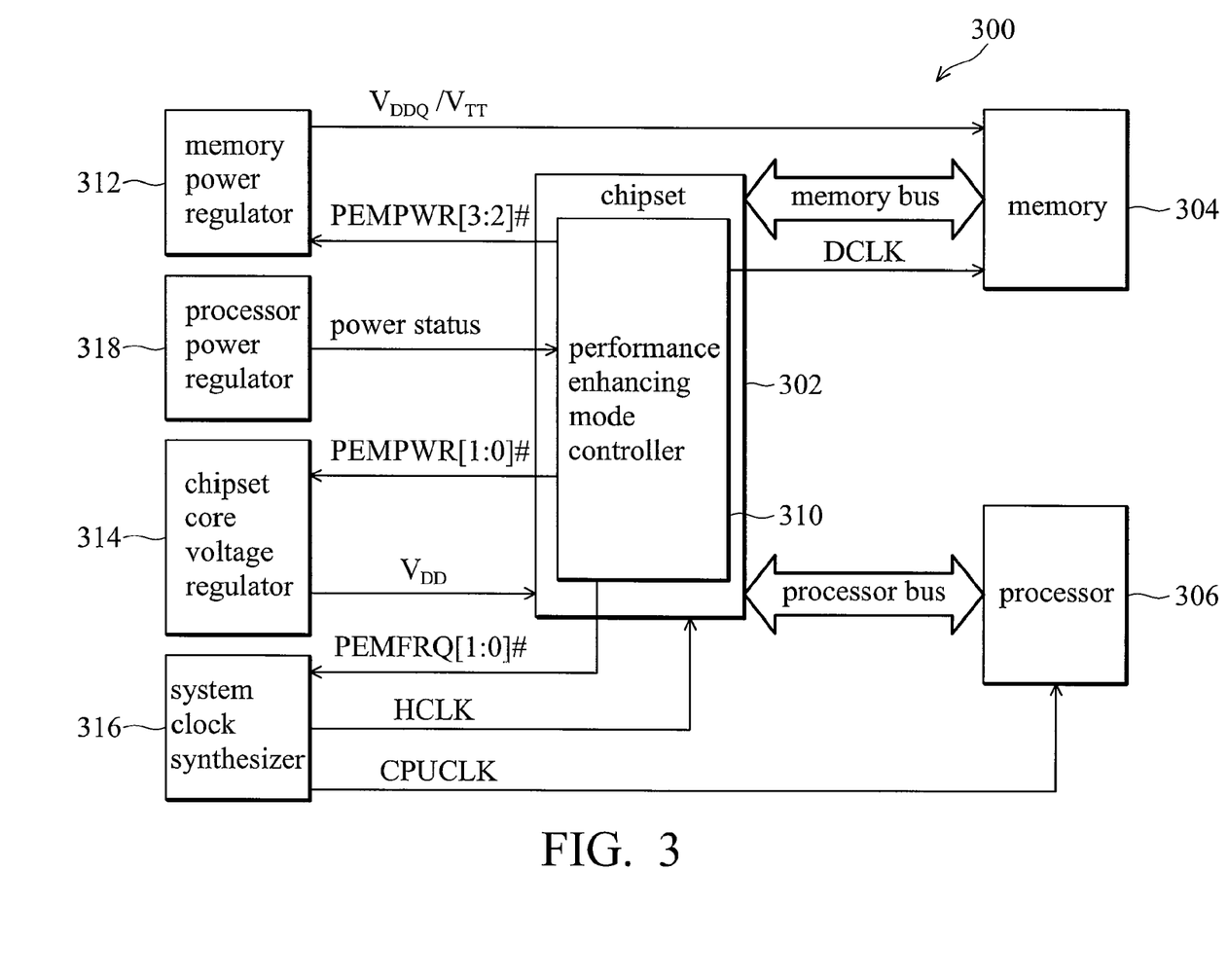
FIG. 3 shows a block diagram of a computer system implementing performance enhancing modes according to the invention.

FIG. 3 shows a block diagram of a computer system 300 implementing performance enhancing modes according to the invention. The computer system 300 includes a chipset 302, a memory 304, and a processor 306. The processor 306 is connected to the chipset 302 through a processor bus, and the memory 304 is connected with the chipset 302 through a memory bus. The computer system 300 also includes a processor power regulator 318 which supplies the voltage of the processor 306, a chipset voltage regulator 314 which supplies a voltage $V_{DD}$ of the chipset 302, a memory power regulator 312 which supplies the voltages $V_{DDQ}$ and $V_{TT}$ of the memory 304, and a system clock synthesizer 316 which provides the clock signal of the computer system 300. The chipset 302 includes two first power control pins PEMPWR[1:0]# coupled to the chipset voltage regulator 314, two second power control pins PEMPWR[3:2]# coupled to the memory power regulator 312, and two frequency control pins PEMFREQ[1:0]# coupled to the system clock synthesizer 316.

The chipset 302 also includes a performance enhancing mode controller 310 which controls the performance enhancing modes of the computer system 300. The performance enhancing mode controller 310 checks a few performance enhancing mode transition conditions to determine whether to automatically raise the performance enhancing mode of the computer system. The performance enhancing mode controller 310 can also measure the current level supplied by the processor power regulator 318 to detect the amount of activity of the processor 306, and then determine whether to raise the performance enhancing mode. Details of detecting the current level will be further illustrated with FIG. 5. A user of the computer system 300 can also manually set the desirable performance enhancing mode through a software application, which adjusts the setting stored in the registers of the performance enhancing mode controller 310. If the performance enhancing mode is determined to be raised, the performance enhancing mode controller 310 signals the system clock synthesizer 316 to increase the frequency of the clock signal CPUCLK of the processor 306, the frequency of clock signal HCLK of the chipset 302, the frequency of the clock signal DCLK of the memory 304, and the working frequency of the processor bus through the frequency control pins PEMFREQ[1:0]#. Thus, the working frequency of processor 306, memory 304 and the processor bus are increased according to the values of table 200 if the performance enhancing mode of computer system 300 is raised. The performance enhancing mode controller 310 also signals the chipset voltage regulator 314 to raise the level of the voltage $V_{DD}$ via the first power control pins PEMPWR[1:0]#, and signals the memory power regulator 312 to raise the level of the voltages $V_{DDQ}$ and $V_{TT}$ via the second power control pins PEMPWR[3:2]#. Thus, the voltage $V_{DD}$ of the chipset 302 and the voltages $V_{DDQ}$ and $V_{TT}$ of the memory 304 is raised according to the values of table 200 if the performance enhancing mode of computer system 300 is raised.

Figure 4:
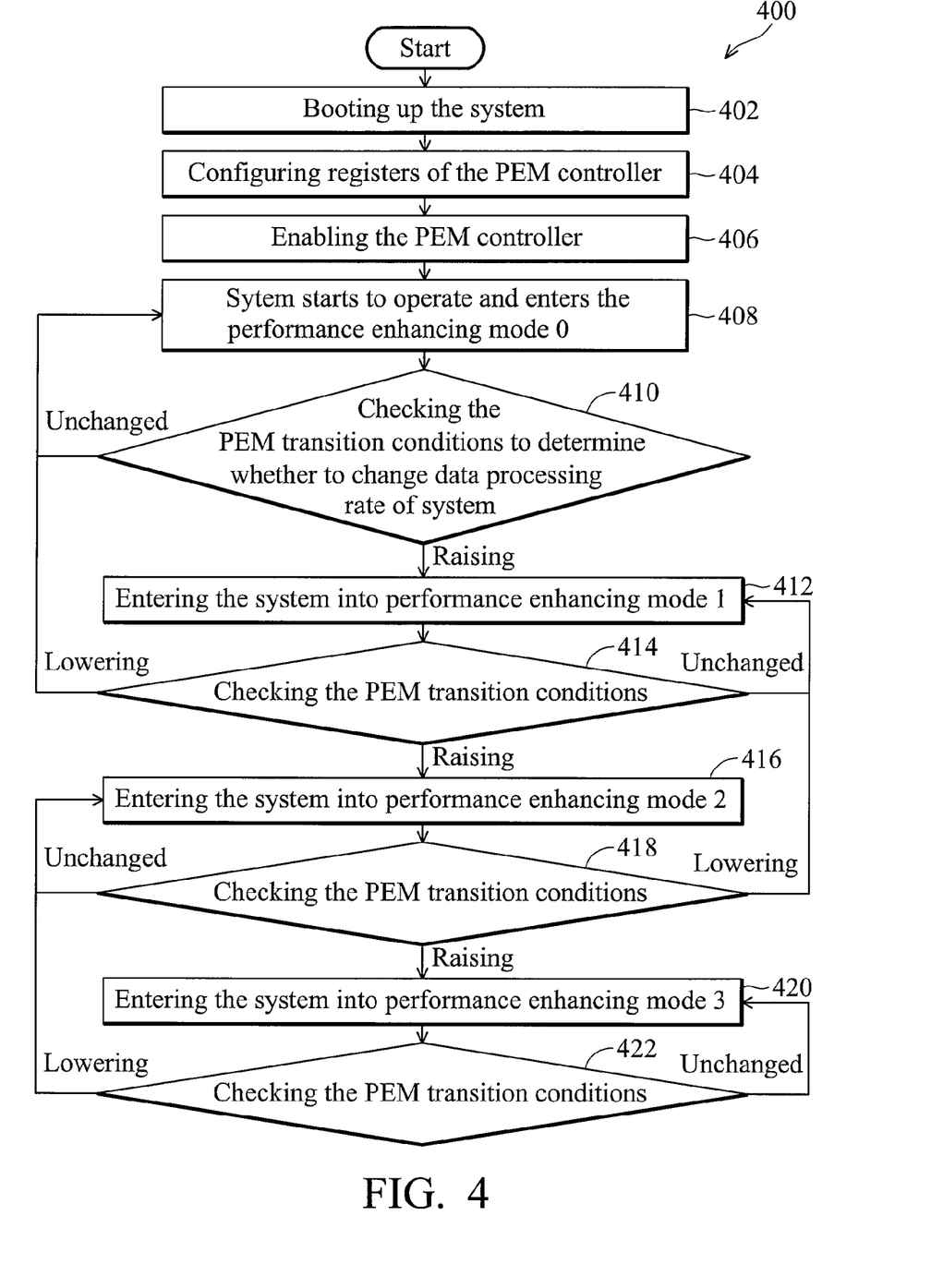
FIG. 4 shows a method for implementing the performance enhancing modes to dynamically raise the data processing capability of the computer system according to the invention.

FIG. 4 shows a method 400 for implementing the performance enhancing modes to raise data processing capability of the computer system 300 according to the invention. The computer system 300 is booted up in step 402. The registers of the performance enhancing mode controller 310 are configured in step 404. The registers store a few predefined values for setting the performance enhancing mode controller 310. The performance enhancing mode controller 310 is then enabled in step 406. The computer system 300 then starts to operate and enters the performance enhancing mode 0 in step 408. The performance enhancing mode controller 310 then checks a few performance enhancing mode transition conditions to determine whether to raise the performance enhancing mode of the computer system in step 410. The performance enhancing mode transition conditions will be further illustrated in FIGS. 5, 6, 7, and 8. If it is determined that the performance enhancing mode of the computer system is to be raised, the performance enhancing mode controller 310 changes the mode of the computer system 300 to the performance enhancing mode 1 in step 412.

The performance enhancing mode controller 310 repeatedly checks the performance enhancing mode transition conditions at a predetermined interval to determine whether to raise or lower the performance enhancing mode of the computer system, such as in steps 414, 418, and 422. The current performance enhancing mode of the computer system may be raised, lowered or unchanged according to the performance enhancing mode transition conditions. If it is determined that the performance enhancing mode is to be unchanged, the current performance enhancing mode remains. If it is determined that the performance enhancing mode is to be raised, the performance enhancing mode controller 310 signals the system clock synthesizer 316 to increase the working frequency of processor 306, chipset 302, memory 304 and the processor bus, and signals the chipset voltage regulator 314 and the memory power regulator 312 to raise the level of the voltages $V_{DD}$, $V_{DDQ}$ and $V_{TT}$, such that the performance enhancing mode is raised from PEM 1 of step 414 to PEM 2 of step 416, or from PEM 2 of step 418 to PEM 3 of step 420. If it is determined that the performance enhancing mode is to be lowered, the performance enhancing mode controller 310 signals the system clock synthesizer 316 to decrease the working frequency of processor 306, chipset 302, memory 304 and the processor bus, and signals the chipset voltage regulator 314 and the memory power regulator 312 to lower the level of the voltages $V_{DD}$, $V_{DDQ}$ and $V_{TT}$, such that the performance enhancing mode is lowered from PEM 3 of step 422 to PEM 2 of step 416, or from PEM 2 of step 418 to PEM 1 of step 412. The details of the process for raising or lowering the performance enhancing mode of the computer system will be respectively illustrated in FIGS. 9a and 9b.

Figure 5:
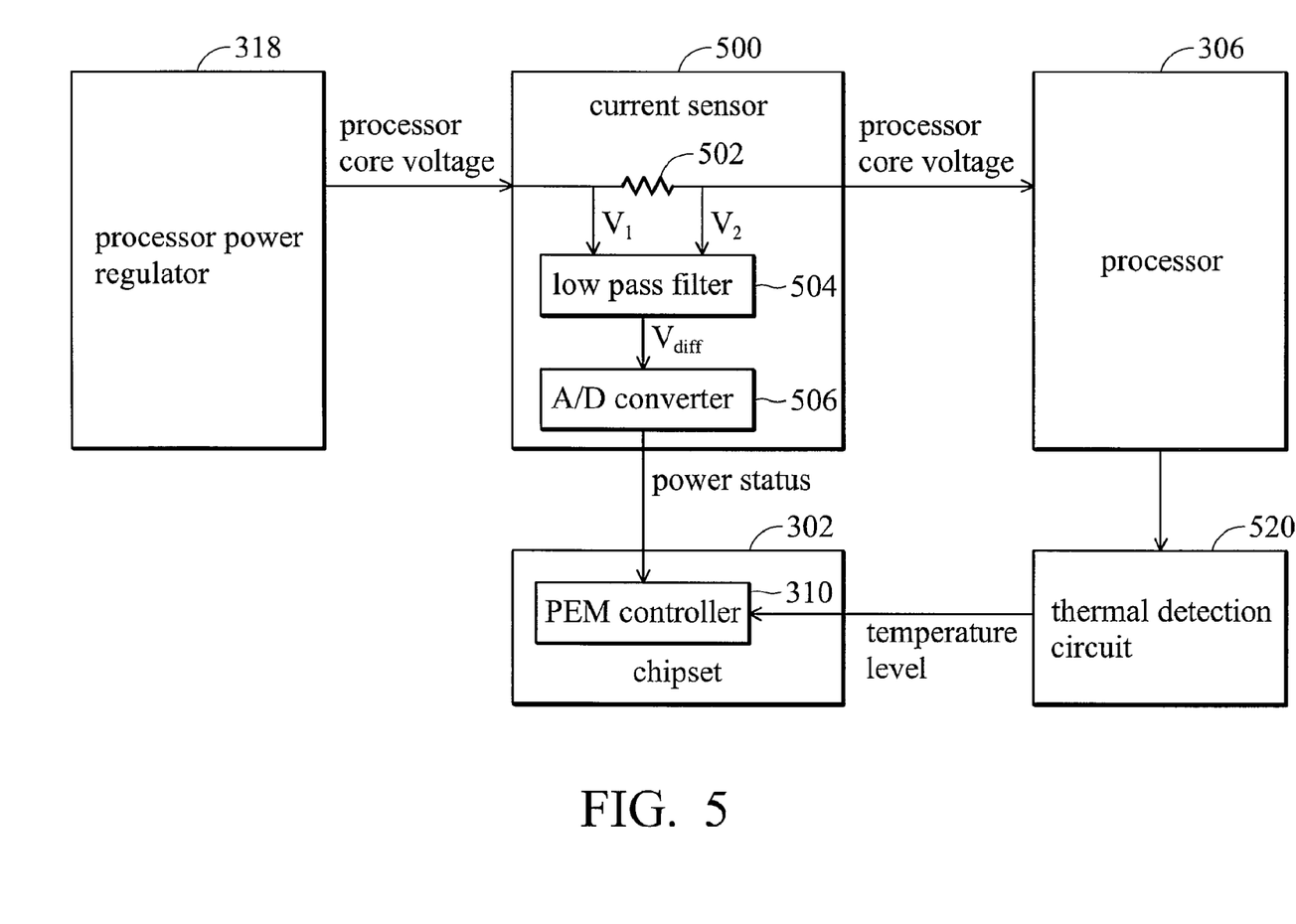
FIG. 5 shows a current sensor and a thermal detection circuit for detecting the amount of activity of a processor of the computer system according to the invention.

FIG. 5 shows a current sensor 500 and a thermal detection circuit 520 for detecting the amount of activity of a processor of the computer system according to the invention. A resistor 502 of the current sensor 500 is coupled between the processor power regulator 318 and the processor 306. When the processor power regulator 318 supplies a processor core voltage to the processor 306, the voltage drop ($V_1$-$V_2$) across the resistor 502 is measured and delivered to the low pass filter 504 to generate the power status signal $V_{diff}$. The power status signal $V_{diff}$ is then transformed from analog to digital format with analog to digital converter 506 and fed to the performance enhancing mode controller 310. Because the power status signal $V_{diff}$ is proportional to the current level consumed by processor 306, it indicates the amount of activity of processor 306, and the performance enhancing mode controller 310 can determine whether to change the performance enhancing mode of the computer system 300 according to its value. In another embodiment of the invention, a thermal detection circuit 520 coupled to the processor 306 detects the temperature level of the processor 306. The temperature level is then delivered to the performance enhancing mode controller 310. Because the temperature level is also proportional to the amount of activity of processor 306, the performance enhancing mode controller 310 can also determine whether to change the performance enhancing mode of the computer system 300 according to its value. Both the current level indicated by power status signal $V_{diff}$ and the temperature level detected by the thermal detection circuit 520 can be taken as one of the performance enhancing mode transition conditions for determining the transition of the performance enhancing mode.

Figure 6:
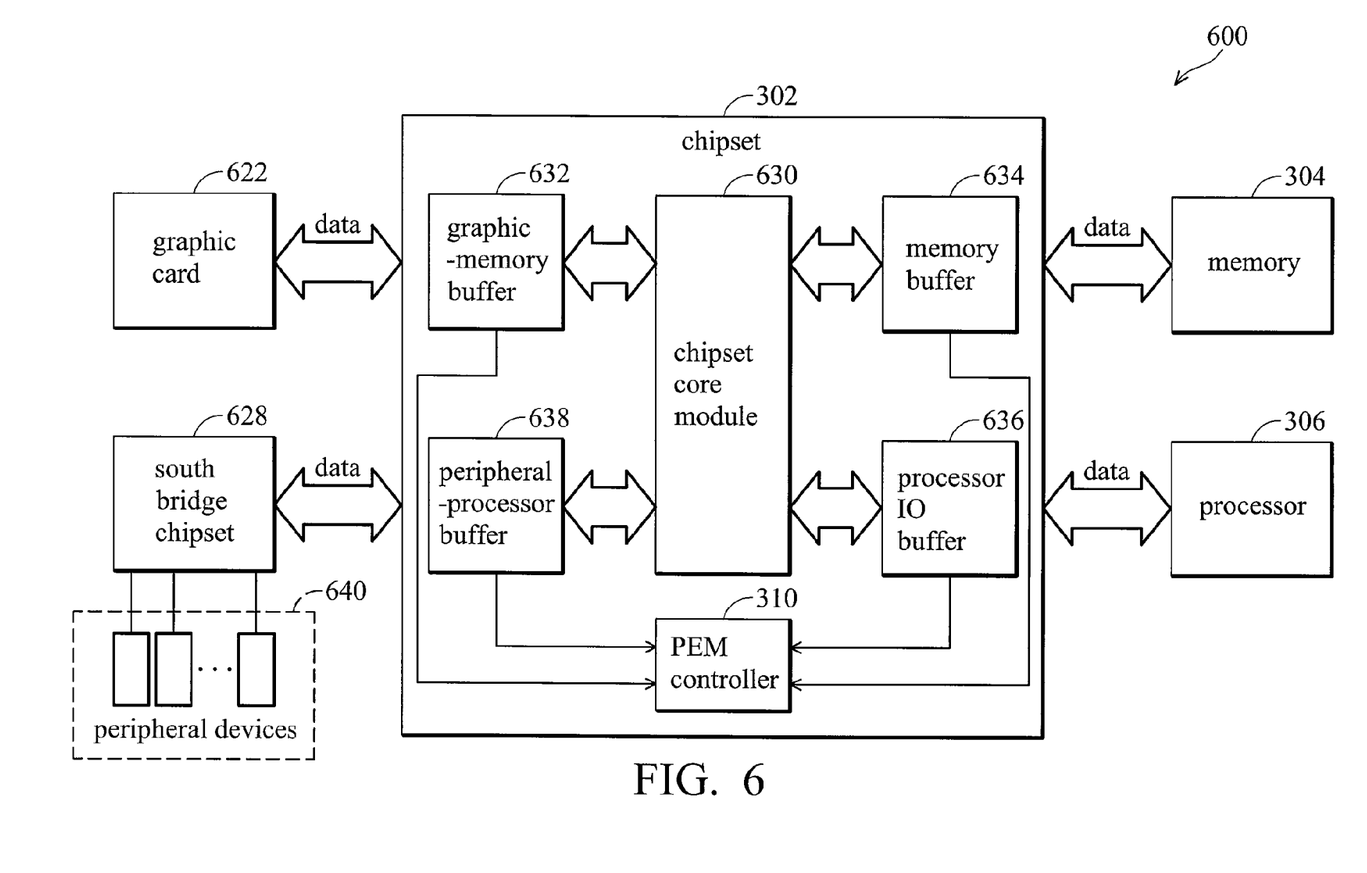
FIG. 6 shows a computer system automatically checking the performance enhancing mode transition conditions according to the invention.

FIG. 6 shows a computer system 600 automatically checking the performance enhancing mode transition conditions according to the invention. The computer system 600 includes the chipset 302, the memory 304, the processor 306, a graphic card 622, a south bridge chipset 628, and a few peripheral devices 640. The south bridge chipset 628 buffers data exchanged between the peripheral devices 640 and the processor 306. The chipset 402 includes a chipset core module 630 and the performance enhancing mode controller 310 of FIG. 3. The chipset also includes a peripheral-processor buffer 638, a processor IO buffer 636, a graphic-memory buffer 632 and a memory buffer 634. The data exchanged between the south-bridge chipset 628 and the chipset 302 is buffered by the peripheral-processor buffer 638. The data exchanged between the processor 306 and the chipset 302 is buffered by the processor input-output buffer 636. The data exchanged between the graphic card 622 and the chipset 302 is buffered by the graphic-memory buffer 632, and the data exchanged between the memory 304 and the chipset 302 is buffered by the memory buffer 634. Because the fill levels of the buffers reflect the amount of activity of the computer system, the performance enhancing mode controller 310 can periodically detect the fill levels of the processor input-output buffer 636, the memory buffer 634, the graphic-memory buffer 632 and the peripheral-processor buffer 638 to determine whether to change the performance enhancing mode of the computer system. Thus, the combined fill level of the buffers could also be the performance enhancing mode transition conditions for determining whether to change the performance enhancing mode.

Figure 7:
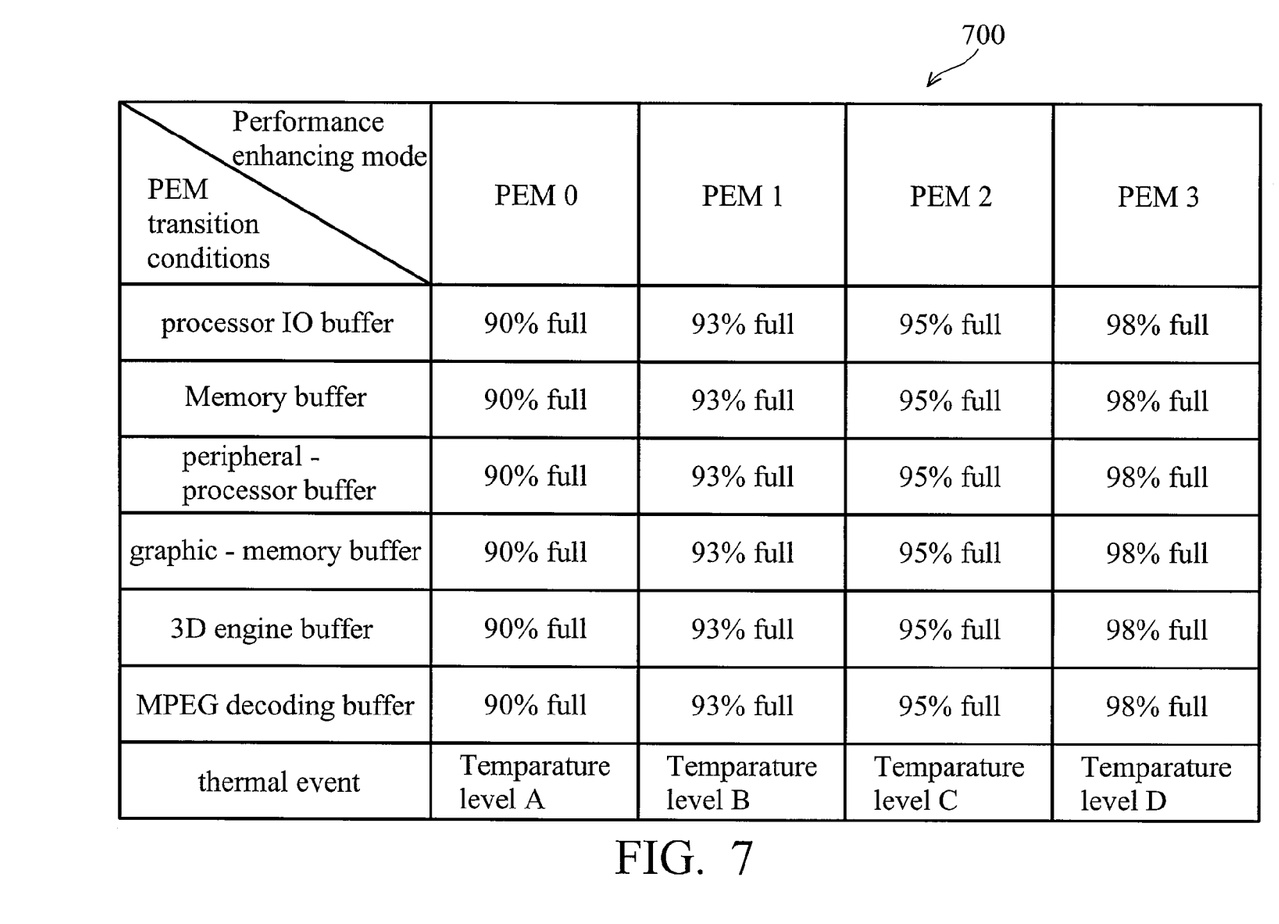
FIG. 7 shows a table listing the performance enhancing mode transition conditions according to the invention.

FIG. 7 shows a table 700 listing the performance enhancing mode transition conditions according to the invention. The four columns of table 700 respectively correspond to the four performance enhancing modes. Each row of table 700 corresponds to one of the performance enhancing mode transition conditions. The former four performance enhancing mode transition conditions are the fill levels of the processor input-output buffer 636, the memory buffer 634, the peripheral-processor buffer 638 and the graphic-memory buffer 632. The fifth row of table 700 shows the fill level of a 3D engine buffer of the chipset 302, and the 3D engine buffer buffers data exchanged between a 3D engine of the processor. The sixth row of table 700 shows the fill level of an MPEG decoding buffer of the chipset 302, buffering data exchanged between the MPEG decoding engine of the processor and the chipset 302. The last row of table 700 shows a thermal event determined according to the temperature level of the processor 306, as illustrated with FIG. 5. For example, if the performance enhancing mode controller 310 finds that some of the buffers are 95% full, the desirable performance enhancing mode of the computer system should be PEM 3, and if the current performance enhancing mode is not PEM 3, the performance enhancing mode is automatically raised. The seven performance enhancing mode transition conditions listed in table 700 and the values in table 700 are only illustrated for example. The designer can set different performance enhancing mode transition conditions according to system requirements.

Figure 8:
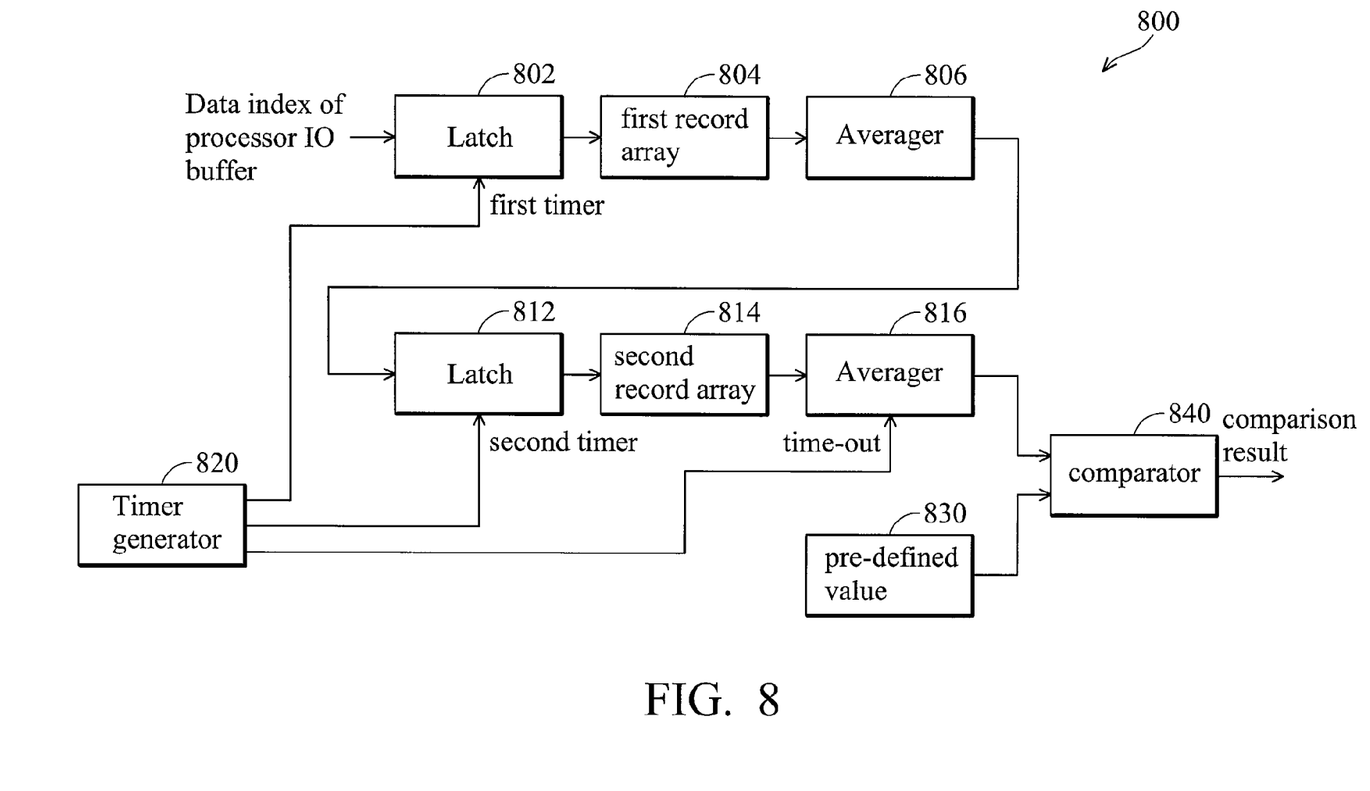
FIG. 8 shows a detection circuit for detecting the fill level of the processor IO buffer according to the invention.

FIG. 8 shows a detection circuit 800 for the performance enhancing mode controller 310 to detect the fill level of the processor IO buffer 636. The detection circuit can also be used to detect the fill level of the other buffers of FIG. 6 or FIG. 7. The data index of the processor IO buffer 636 is delivered to the latch 802. Every time the latch 802 is triggered by a first timer sent from the timer generator 820, the latch 802 holds the current data index, and every data index held by the latch 802 is then recorded in the first record array 804. The data indexes recorded in the first record array 804 are then averaged by an averager 806 to generate a mean data index of the processor IO buffer 636. The mean data index is further delivered to the latch 812. Every time the latch 812 is triggered by a second timer sent from the timer generator 820, the latch 812 holds current mean data index, and every mean data index held by the latch 812 is then recorded in the second record array 814. When the averager 816 is triggered by a timeout sent from the timer generator 820, the mean data indexes recorded in the second record array 814 are averaged by an averager 816 to generate a mean fill level of the processor IO buffer 636. A register 830 stores some pre-defined values appearing in the first row of table 700. Thus, a comparator can compare the mean fill level of the processor IO buffer 636 with the values stored in the register 830 to determine the desirable performance enhancing mode of the computer system.

Figure 9A:
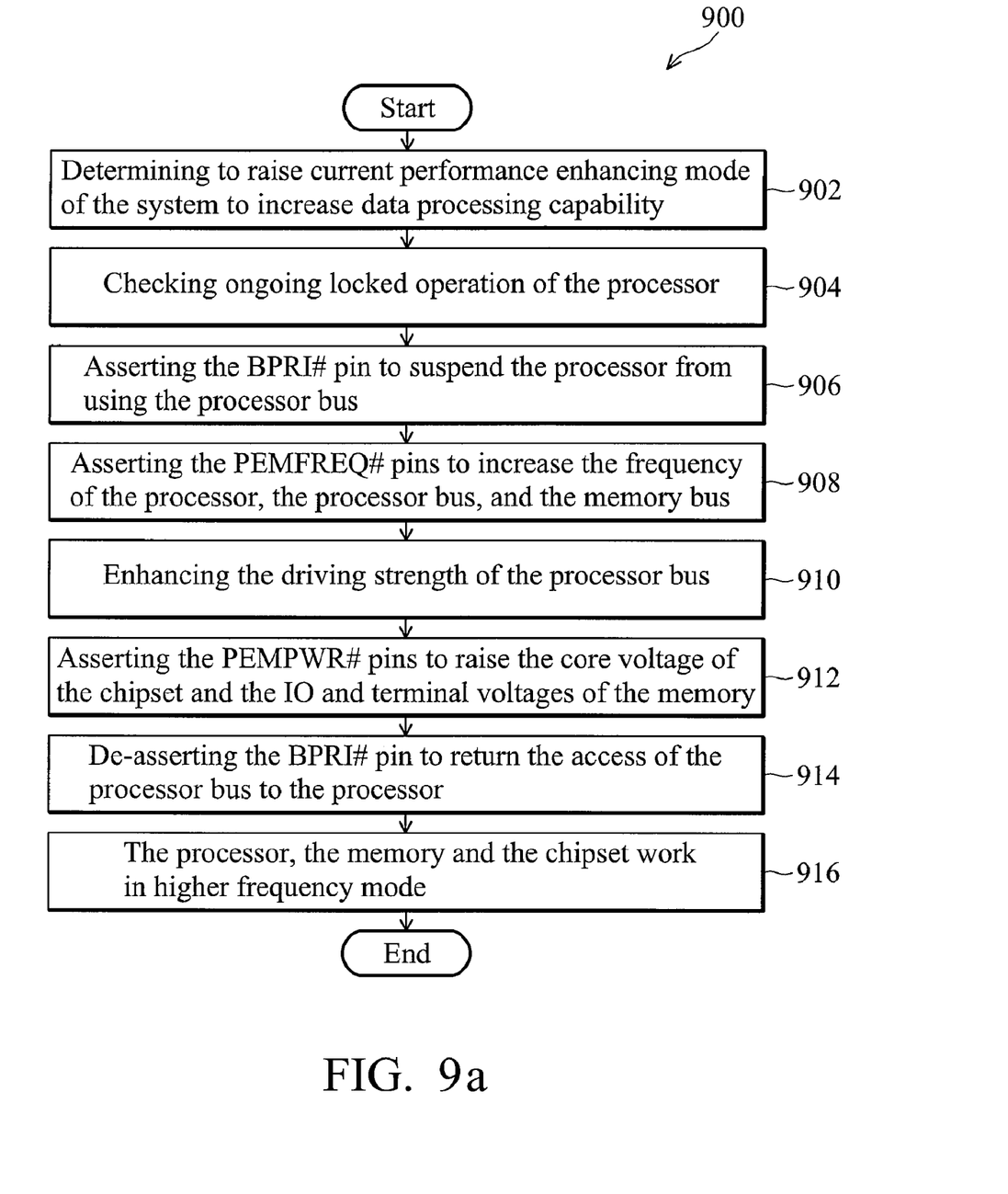
FIG. 9a shows a method for raising the performance enhancing mode of a computer system according to the invention.

FIG. 9a shows a method 900 for raising the performance enhancing mode of a computer system according to the invention. The performance enhancing mode controller 310 first determines to raise the current performance enhancing mode of the computer system to enhance the data processing capability in step 902. Because some ongoing locked operation of the processor 306 may be in process, the performance enhancing mode controller 310 must wait until end of the locked operation in step 904. Before the frequency of the computer system is increased, the performance enhancing mode controller 310 has to suspend the processor 306 from using the processor bus during the transition of the performance enhancing mode. Hence, the performance enhancing mode controller 310 asserts a BPRI# pin of the chipset 302 in step 906 to signal the processor 306 that the chipset 302 will take control of the processor bus, and the processor 306 is suspended from the processor bus. The performance enhancing mode controller 310 then asserts the PEMFREQ# pins of chipset 302 to increase the working frequency of the processor 306, the processor bus, and the memory 304 in step 908. The performance enhancing mode controller 310 also enhances the driving strength of the processor bus in step 910. The performance enhancing mode controller 310 then asserts the PEMPWR# pins of chipset 302 to raise the voltage $V_{DD}$ of the chipset 302 and the voltages $V_{DDQ}$ and $V_{TT}$ of the memory 304 in step 912. Because the transition tasks are complete, the chipset 302 now releases control of the processor bus. The BPRI# pin is then de-asserted to return the access of the processor bus to the processor 306 in step 914. Thus, the processor 306, the memory 304 and the chipset 302 operate at higher frequency and voltage in step 916. The BPRI# pin of step 906 and 914 can be substituted by a BNR# pin of the chipset.

Figure 9B:
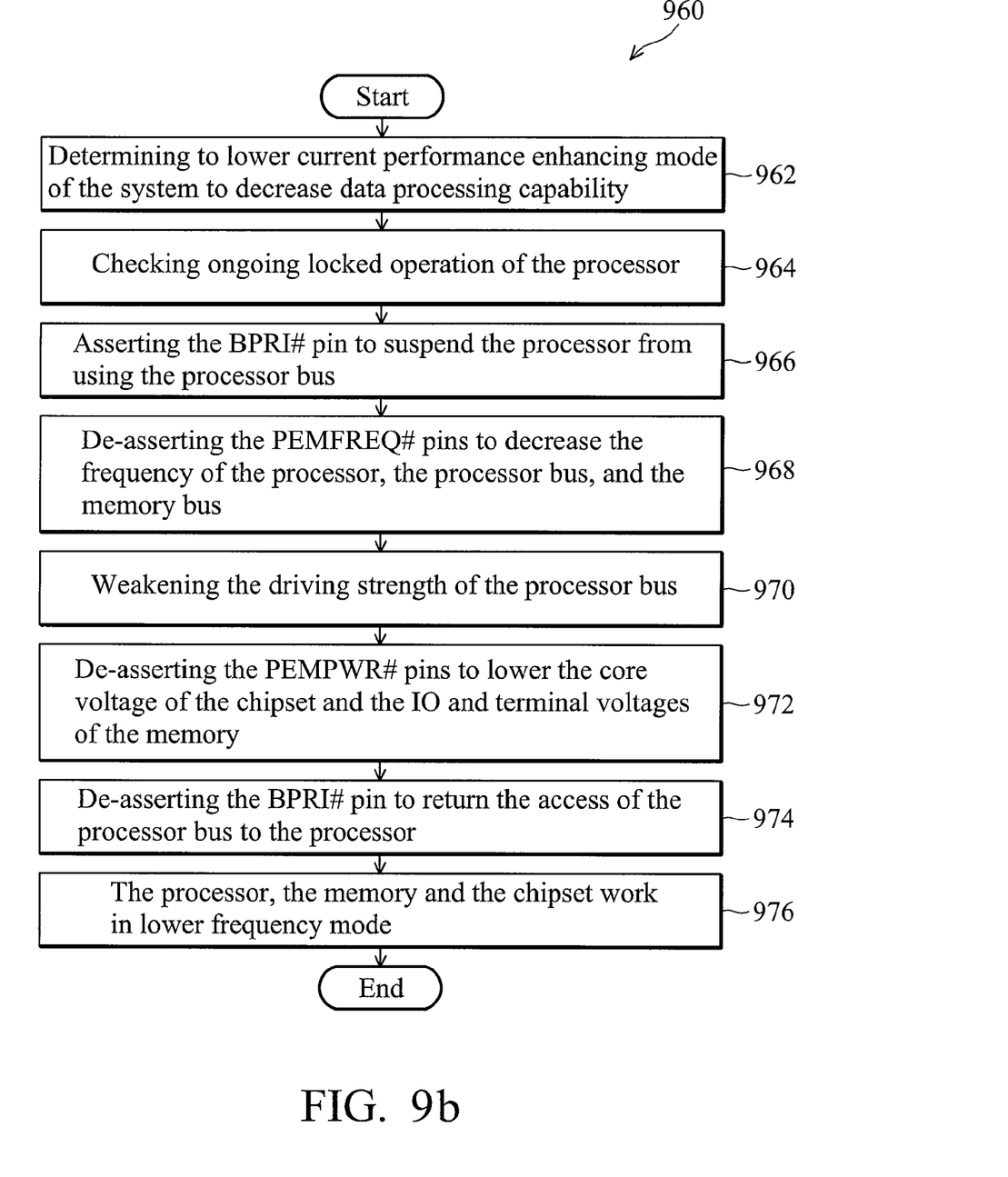
FIG. 9b shows a method for lowering the performance enhancing mode of a computer system according to the invention.

FIG. 9b shows a method 960 for lowering the performance enhancing mode of a computer system according to the invention. The performance enhancing mode controller 310 first determines to lower current performance enhancing mode of the computer system to decrease data processing rate in step 962. Because some ongoing locked operation of the processor 306 may be in process, the performance enhancing mode controller 310 must wait until the end of the locked operation in step 964. Before the frequency of the computer system is decreased, the performance enhancing mode controller 310 has to suspend the processor 306 from using the processor bus during the transition of the performance enhancing mode. Hence, the performance enhancing mode controller 310 asserts a BPRI# pin of the chipset 302 in step 966 to signal the processor 306 that the chipset 302 will take control of the processor bus. The performance enhancing mode controller 310 then de-asserts the PEMFREQ# pins of chipset 302 to decrease the working frequency of the processor 306, the processor bus, and the memory 304 in step 968. The performance enhancing mode controller 310 also weakens the driving strength of the processor bus in step 970. The performance enhancing mode controller 310 then de-asserts the PEMPWR# pins of chipset 302 to lower the voltage $V_{DD}$ of the chipset 302 and the voltages $V_{DDQ}$ and $V_{TT}$ of the memory 304 in step 972. Because the transition tasks are complete, the chipset 302 now releases control of the processor bus. The BPRI# pin is then de-asserted to return the access of the processor bus to the processor 306 in step 974. Thus, the processor 306, the memory 304 and the chipset 302 operate at higher frequency and voltage in step 976. The BPRI# pin of step 966 and 974 can be substituted by a BNR# pin of the chipset.

The invention provides a method for increasing the data processing capability of a computer system while the computer system is operating. The chipset can automatically detect the amount of activity of the computer system to determine the desirable data processing capability. By dynamically increasing the working frequency of the computer system and raising the voltage level of the computer system, the data processing rate of the computer system is increased according to the application of the computer system. No reset of the computer system is required to achieve the transition between different working frequencies.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for dynamically increasing the data processing capability of a computer system while the computer system is operating, wherein the computer system comprises a processor, a memory and a chipset, and the processor is connected with the chipset through a processor bus, the method comprising:

classifying the data processing capability of the computer system into a predetermined number of performance enhancing modes;

detecting a fill level of at least one buffer of the chipset, wherein the at least one buffer buffering data exchanged between the chipset and the processor, the memory, or a peripheral device;

detecting a temperature level of the processor;

checking at least one performance enhancing mode transition condition to determine whether to automatically raise the performance enhancing mode of the computer system, wherein the at least one performance enhancing mode transition condition comprises whether the fill level of the at least one buffer is greater than a fill level threshold and whether the temperature level is greater than a temperature threshold;

suspending the processor from using the processor bus during the transition of the performance enhancing mode of the computer system;

raising the performance enhancing mode of the computer system by increasing a working frequency of the processor, a working frequency of the processor bus and a working frequency of the memory;

wherein the data processing rate of the computer system is further increased when the performance enhancing mode of the computer system is further raised.

2. The method as claimed in claim 1, wherein the raising step is further implemented by raising a voltage supply level of the chipset and a voltage supply level of the memory.

3. The method as claimed in claim 1, wherein the raising step is further implemented by enhancing a driving strength of the processor bus.

4. The method as claimed in claim 1, wherein the chipset includes a processor input-output buffer buffering data exchanged between the processor and the chipset, a memory buffer buffering data exchanged between the memory and the chipset, a graphic-memory buffer buffering data exchanged between a graphic card and the chipset, and a peripheral-processor buffer buffering data exchanged between a southbridge chipset and the chipset, and the at least one performance enhancing mode transition condition is selected from the group of a fill level of the processor input-output buffer, a fill level of the memory buffer, a fill level of the graphic-memory buffer, a fill level of the peripheral-processor buffer, and the combination thereof.

5. The method as claimed in claim 1, wherein the chipset further includes a 3D engine buffer buffering data exchanged between a 3D engine of the processor and the chipset and an MPEG decoding buffer buffering data exchanged between an MPEG decoding engine of the processor and the chipset, and the at least one performance enhancing mode transition condition is selected from the group of a fill level of the 3D engine buffer, a fill level of the MPEG decoding buffer, and the combination thereof.

6. The method as claimed in claim 1, wherein the at least one performance enhancing mode transition condition includes a current level supplied to the processor.

7. The method as claimed in claim 1, wherein the method further comprises providing a software application for a user to manually adjust the performance enhancing mode of the computer system.

8. The method as claimed in claim 1, wherein the suspending step is implemented by asserting a BPRI# pin of the chipset to signal the processor that the chipset will take control of the processor bus.

9. The method as claimed in claim 1, wherein the suspending step is implemented by asserting a BNR# pin of the chipset to signal the processor that the chipset will take control of the processor bus.

10. A method for dynamically increasing the data processing capability of a computer system while the computer system is operating, wherein the computer system comprises a processor, a memory and a chipset, the processor is connected with the chipset through a processor bus, and the data processing capability of the computer system is classified into a predetermined number of performance enhancing modes, the method comprising:

enabling a performance enhancing mode controller included in the chipset to control the performance enhancing modes of the computer system;

detecting a fill level of at least one buffer of the chipset, wherein the at least one buffer buffering data exchanged between the chipset and the processor, the memory, or a peripheral device;

detecting a temperature level of the processor;

checking at least one performance enhancing mode transition condition to determine whether to raise the performance enhancing mode of the computer system, wherein the at least one performance enhancing mode transition condition comprises whether the fill level of the at least one buffer is greater than a fill level threshold and whether the temperature level is greater than a temperature threshold;

asserting a pin of the chipset to suspend the processor from using the processor bus during the transition of the performance enhancing mode of the computer system;

increasing a working frequency of the processor, a working frequency of the processor bus and a working frequency of the memory when the performance enhancing mode is raised; and de-asserting the pin of the chipset after the transition of the performance enhancing mode of the computer system;

wherein the data processing rate of the computer system is further increased when the performance enhancing mode of the computer system is further raised.

11. The method as claimed in claim 10, wherein the method further comprises increasing a voltage supply level of the chipset and a voltage supply level of the memory when the performance enhancing mode is raised.

12. The method as claimed in claim 10, wherein the method further comprises enhancing a driving strength of the processor bus when the performance enhancing mode is raised.

13. The method as claimed in claim 10, wherein the chipset includes a processor input-output buffer buffering data exchanged between the processor and the chipset, a memory buffer buffering data exchanged between the memory and the chipset, a graphic-memory buffer buffering data exchanged between a graphic card and the chipset, and a peripheral-processor buffer buffering data exchanged between a southbridge chipset and the chipset, and the at least one performance enhancing mode transition condition is selected from the group of a fill level of the processor input-output buffer, a fill level of the memory buffer, a fill level of the graphic-memory buffer, a fill level of the peripheral-processor buffer, and the combination thereof.

14. The method as claimed in claim 10, wherein the chipset further includes a 3D engine buffer buffering data exchanged between a 3D engine of the processor and the chipset and a MPEG decoding buffer buffering data exchanged between a MPEG decoding engine of the processor and the chipset, and the at least one performance enhancing mode transition condition is selected from the group of a fill level of the 3D engine buffer, a fill level of the MPEG decoding buffer and the combination thereof.

15. The method as claimed in claim 10, wherein the at least one performance enhancing mode transition condition includes a current level supplied to the processor.

16. The method as claimed in claim 10, wherein the method further comprises providing a software application for a user to manually set the performance enhancing mode of the computer system.

17. The method as claimed in claim 10, wherein the method further comprises checking ongoing locked operations of the processor before the asserting step.

18. A chipset, capable of dynamically increasing the data processing capability of a computer system while the computer system is operating, wherein the computer system comprises a processor, a memory and a chipset, the processor is connected to the chipset through a processor bus, and the data processing capability of the computer system is classified into a predetermined number of performance enhancing modes, the chipset comprising:
- at least one buffer, buffering data exchanged between the chipset and the processor, the memory, or a peripheral device;
- at least one frequency control pin, coupled between the chipset and a system clock synthesizer which controls a working frequency of the processor, a working frequency of the processor bus and a working frequency of the memory; and
- a performance enhancing mode controller, coupled to the frequency control pin, for detecting a fill level of the at least one buffer, receiving a temperature level of the processor, checking at least one performance enhancing mode transition condition to determine whether to raise the performance enhancing mode of the computer system, suspending the processor from using the processor bus during the transition of the performance enhancing mode of the computer system, and signaling the system clock synthesizer to increase the working frequencies of the processor, the processor bus, and the memory through the at least one frequency control pin when the performance enhancing mode is raised, wherein the at least one performance enhancing mode transition condition comprises whether the fill level of the at least one buffer is greater than a fill level threshold and whether the temperature level is greater than a temperature threshold;

wherein the data processing rate of the computer system is further increased when the performance enhancing mode of the computer system is further raised.

19. The chipset as claimed in claim 18, wherein the chipset further comprises:
- at least one first power control pin, coupled between the chipset and a chipset voltage regulator which supplies a voltage of the chipset; and
- at least one second power control pin, coupled between the chipset and a memory power regulator which supplies a voltage of the memory;

wherein the performance enhancing mode controller is coupled to the at least one first and second power control pins, and the performance enhancing mode controller signals the chipset voltage regulator to raise the level of the voltage of the chipset via the at least one first power control pin when the performance enhancing mode is raised, and signals the memory power regulator to raise the level of the voltage of the memory via the at least one second power control pin when the performance enhancing mode is raised.

20. The chipset as claimed in claim 18, wherein the performance enhancing mode controller suspends the processor from using the processor bus by asserting a BPRI# or a BNR# pin of the chipset, and the performance enhancing mode controller de-asserts the BPRI# or the BNR# pin of the chipset after the transition of the performance enhancing mode.

21. The chipset as claimed in claim 18, wherein the chipset includes a processor input-output buffer buffering data exchanged between the processor and the chipset, a memory buffer buffering data exchanged between the memory and the chipset, a graphic-memory buffer buffering data exchanged between a graphic card and the chipset, and a peripheral-processor buffer buffering data exchanged between a southbridge chipset and the chipset, and the at least one performance enhancing mode transition condition is selected from the group of a fill level of the processor input-output buffer, a fill level of the memory buffer, a fill level of the graphic-memory buffer, a fill level of the peripheral-processor buffer, and the combination thereof.

22. The chipset as claimed in claim 18, wherein the chipset further includes a 3D engine buffer buffering data exchanged between a 3D engine of the processor and the chipset and a MPEG decoding buffer buffering data exchanged between a MPEG decoding engine of the processor and the chipset, and the at least one performance enhancing mode transition condition is selected from the group of a fill level of the 3D engine buffer, a fill level of the MPEG decoding buffer and the combination thereof.

23. The chipset as claimed in claim 18, wherein the at least one performance enhancing mode transition condition includes a current level supplied to the processor.

24. The chipset as claimed in claim 18, wherein a software application is provided for a user to manually set the performance enhancing mode of the computer system.

25. The chipset as claimed in claim 18, wherein the performance enhancing mode controller further enhances a driving strength of the processor bus when the performance enhancing mode is raised.

* * * * *